(12) United States Patent
Wu et al.

(10) Patent No.: US 11,816,809 B2
(45) Date of Patent: Nov. 14, 2023

(54) ALIGNMENT- AND ORIENTATION-BASED TASK ASSISTANCE IN AN AR ENVIRONMENT

(71) Applicant: Palo Alto Research Center Incorporated, Palo Alto, CA (US)

(72) Inventors: Hsuan-Ting Wu, Mountain View, CA (US); Robert R. Price, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/747,741

(22) Filed: May 18, 2022

(65) Prior Publication Data

US 2022/0277532 A1    Sep. 1, 2022

Related U.S. Application Data

(63) Continuation of application No. 16/237,285, filed on Dec. 31, 2018, now Pat. No. 11,443,495.

(51) Int. Cl.

| | | |
|---|---|---|
| *G06T 19/20* | (2011.01) | |
| *G06T 19/00* | (2011.01) | |
| *G06F 30/20* | (2020.01) | |
| *G06Q 10/0631* | (2023.01) | |

(52) U.S. Cl.
CPC ............ *G06T 19/20* (2013.01); *G06F 30/20* (2020.01); *G06Q 10/06316* (2013.01); *G06T 19/006* (2013.01)

(58) Field of Classification Search
CPC . G06T 19/20; G06T 19/006; G06Q 10/06316; G06F 30/20; G06F 2111/18; G06F 30/12; G06F 3/011
See application file for complete search history.

(56) References Cited

U.S. PATENT DOCUMENTS

| | | |
|---|---|---|
| 10,147,023 B1 | 12/2018 | Klaudiny |
| 10,229,539 B2 | 3/2019 | Shikoda |
| 10,304,159 B2 * | 5/2019 | Aoyagi .................. G06T 19/20 |

(Continued)

OTHER PUBLICATIONS

Ohan Oda, et al.; "Virtual replicas for remote assistance in virtual and augmented reality", Proceedings of the 28th Annual ACM Symposium on User Interface Software & Technology, Nov. 8-11, 2015, Charlotte, NC, pp. 405-415 (Year: 2015).*

(Continued)

*Primary Examiner* — Jin Cheng Wang
(74) *Attorney, Agent, or Firm* — Shun Yao; Yao Legal Services, Inc.

(57) ABSTRACT

Embodiments described herein provide a system for facilitating dynamic assistance to a user in an augmented reality (AR) environment of an AR device. During operation, the system detects a first element of an object using an object detector, wherein the object is associated with a task and the first element is associated with a step of the task. The system then determines an orientation and an alignment of the first element in the physical world of the user, and an overlay for the first element. The overlay can distinctly highlight one or more regions of the first element and indicate how the first element fits in the object. The system then applies the overlay to the one or more regions of the first element at the determined orientation in the AR environment.

20 Claims, 13 Drawing Sheets

(3 of 13 Drawing Sheet(s) Filed in Color)

(56) References Cited

U.S. PATENT DOCUMENTS

| | | | |
|---|---|---|---|
| 10,366,521 B1* | 7/2019 | Peacock | G02B 27/017 |
| 2008/0189083 A1* | 8/2008 | Schell | G06F 30/17 |
| | | | 707/999.005 |
| 2010/0040272 A1 | 2/2010 | Zheng | |
| 2012/0200601 A1 | 8/2012 | Osterhout | |
| 2013/0127980 A1 | 5/2013 | Haddick | |
| 2015/0037775 A1 | 2/2015 | Ottensmeyer | |
| 2016/0260261 A1* | 9/2016 | Hsu | A61F 9/06 |
| 2016/0292925 A1* | 10/2016 | Montgomerie | H04L 65/75 |
| 2016/0328887 A1* | 11/2016 | Elvezio | G09B 19/003 |
| 2016/0335578 A1 | 11/2016 | Sagawa | |
| 2016/0349511 A1 | 12/2016 | Meiron | |
| 2017/0366805 A1 | 12/2017 | Sevostianov | |
| 2018/0035606 A1 | 2/2018 | Burdoucci | |
| 2018/0204160 A1 | 7/2018 | Chehade | |
| 2018/0315329 A1 | 11/2018 | D'Amato | |
| 2018/0336732 A1* | 11/2018 | Schuster | G06Q 10/0875 |
| 2019/0156202 A1 | 5/2019 | Falk | |
| 2019/0362556 A1 | 11/2019 | Ben-Dor | |
| 2020/0081249 A1* | 3/2020 | Brusnitsyn | G06T 19/006 |
| 2020/0210780 A1 | 7/2020 | Torres | |
| 2021/0350588 A1* | 11/2021 | Tanida | G05B 19/41805 |

OTHER PUBLICATIONS

Kevin Lai et al., "A Large-Scale Hierarchical Multi-View RGB-D Object Dataset", Robotics and Automation (ICRA), 2011 IEEE International Conferene on, IEEE, May 9, 2011, pp. 1817-1824. *abstract* * Section IV* * Figure 6 *.

Georgios Georgakis et al., "Multiview RGB-D Dataset for Object Instance Detection", 2016 Fourth International Conference on 3D Vision (3DV), Sep. 26, 2016, pp. 426-434. * Abstract* * Section 3 *.

Aldoma Aitor et al., "Automation of "Ground Truth" Annotation for Multi-View RGB-D Object Instance Recognition Datasets", 2014 IEEE/RSJ International Conference on Intelligent Robots and Systems, IEEE, Sep. 14, 2014, pp. 5016-5023. * abstract* * Section III *.

Pat Marion et al., "LabelFusion: a Pipeline for Generating Ground Truth Labels for Real RGBD Data of Cluttered Scenes", Jul. 15, 2017, retrieved form the Internet: URL: https://arxiv.org/pdf/1707.04796.pdf. * abstract* * Section 111 *.

Alhaija et al., "Augmented Reality Meets Computer Vision: Efficient Data Generation for Urban Driving Scenes", Aug. 4, 2017.

Kaiming He, Georgia Gkioxari, Piotr Dollar Ross Girshick, "Mask R-CNN", arXiv:1703.06870v1 [cs.CV] Mar. 20, 2017.

Umar Iqbal, Anton Milan, and Juergen Gall, "Pose Track: Joint Multi-Person Pose Estimation and Tracking ", arXiv:1611.07727v3 [ cs.CV] Apr. 7, 2017.

Mueller, How to Get Phone Notifications When Your Brother HL-3170CDW Printer Runs Out of Paper, https://web.archive.org/web/20180201064332/http://www.shareyourrepair.com/2014/12/how-to-get-push-notifications-from-brother-printers-with-gmail-boxcar.html (Year: 2018).

Epson Printer Says Out of Paper but It Isn't, https://smartprintsupplies.com/blogs/news/ p-strong-epson-printer-says-out-of-paper-but-it-isnt-strong-p-p-p (Year: 2018).

Adepu et al. Control Behavior Integrity for Distributed Cyber-Physical Systems (Year: 2018).

Khurram Soomro "UCF101: A Dataset of 101 Human Actions Classes From Videos in the Wild" Dec. 2012.

J. L. Pech-Pacheco et al "Diatom autofocusing in brightheld microscopy: a comparative study" IEEE 2000, Feb. 2000.

Said Pertuz et al "Analysis of focus measure operators in shape-from-focus", Research gate Nov. 2012, Article Received Jun. 3, 2011, Received in Revised form Oct. 15, 2012, Accepted Nov. 7, 2012, Available priline Nov. 16, 2012.

* cited by examiner

ALIGNMENT- AND ORIENTATION-BASED TASK ASSISTANCE IN AN AR ENVIRONMENT

RELATED APPLICATION

This application is a continuation of U.S. patent application Ser. No. 16/237,285, entitled "Alignment- and Orientation-based Task Assistance in an AR Environment," by inventors Hsuan-Ting Wu and Robert R. Price, filed 31 Dec. 2018.

The present disclosure is related to U.S. patent application Ser. No. 16/192,634, titled "AR-Enabled Labeling using Aligned CAD Models," by inventor Matthew A. Shreve and Robert R. Price, the disclosure of which is incorporated by reference herein.

BACKGROUND

Field

This disclosure is generally related to the field of computer vision systems. More specifically, this disclosure is related to a system and method for facilitating alignment- and orientation-based task assistance to a user of augmented reality (AR) technology.

RELATED ART

Virtual reality (VR) systems are growing in scale and usage, and can generate a high-impact visceral experience that can range from performing normal practical tasks (such as office work) to more complicated tasks (such as in the areas of education, training, and entertainment). Current VR systems, including mixed reality (MR) systems and augmented reality (AR) systems, can identify physical objects which exist in a user's physical environment, and can render corresponding VR objects for the user. Such rendering can be used for assisting users to perform tasks.

Typically, a way of conveying task assistance to a user can be traditional assembly diagrams. An assembly diagram may use techniques, such as leader lines to show how to connect parts of an object. However, the assembly diagram can become too complex if the corresponding object includes a large number of parts. An AR system can render such complex objects for assisting the user. For example, many AR systems provide animated overlays for helping the user understand how a particular part of an object should be placed or what motions are required, etc.

However, many critical details may not be obvious from the animation, or can be too complex for the animation. As a result, the user may not be able to follow or mimic the action depicted in such animated overlays. Additionally, today's AR systems may not take into account the layout and orientation of the part in the physical world of the user. Regardless of how the part is oriented in the physical world, the AR system may play the same animation. In complex assemblies, it may be difficult for the user to determine how that part fits with other parts of the object, and what fasteners and/or tools might be needed to complete the task.

While AR systems bring many desirable features to task assistance, some issues remain unsolved in assisting users understand orientation and alignment of an object while executing a task.

SUMMARY

Embodiments described herein provide a system for facilitating dynamic assistance to a user in an augmented reality (AR) environment of an AR device. During operation, the system detects a first element of an object using an object detector, wherein the object is associated with a task and the first element is associated with a step of the task. The system then determines an orientation and an alignment of the first element in the physical world of the user, and an overlay for the first element. The overlay can distinctly highlight one or more regions of the first element and indicate how the first element fits in the object. The system then applies the overlay to the one or more regions of the first element at the determined orientation in the AR environment.

In a variation on this embodiment, the system determines that the first element is needed for the step and projects a hologram of the first element prior to locating the first element in an operating range of the AR device.

In a variation on this embodiment, the overlay includes a distinct mark for a respective region of the one or more regions of the first element and the distinct mark indicates how that region fits with one or more other elements of the object.

In a variation on this embodiment, the system determines whether a tool or a fastener is needed for the step. The system can determine that the tool or the fastener is in an operating range of the AR device and highlight the tool or the fastener in the AR environment.

In a variation on this embodiment, the system determines one or more elements of the object that are attachable to the first element and projects a hologram comprising the first element attached to the one or more elements in the AR environment.

In a variation on this embodiment, the system enhances a resolution of an image quality of the first element in the AR environment by increasing prominence of a symmetry-breaking feature of the first element.

In a variation on this embodiment, the system determines a first region of the one or more regions of the first element. The first region is attachable to a second region of a second element of the object. The system can set a same mark in the overlay for the first and second regions. The system then applies the overlay by applying the same mark to the first and second regions.

In a variation on this embodiment, the system determines whether the system is capable of determining that the step is complete. If the system can determine that the step is complete, the system detects a third element of the object using the object detector. The third element can be associated with a next step of the task. On the other hand, if the system cannot determine that the step is complete, the system waits for an instruction from the user.

In a variation on this embodiment, the system obtains a three-dimensional model of the first element, identifies the one or more regions in the three-dimensional model, and applies the overlay based on the identified one or more regions in the three-dimensional model.

In a variation on this embodiment, the system determines the step of the task from a task model that includes one or more steps for completing the task, and one or more elements of the object associated with a respective step of the one or more steps.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

Figure 1A:
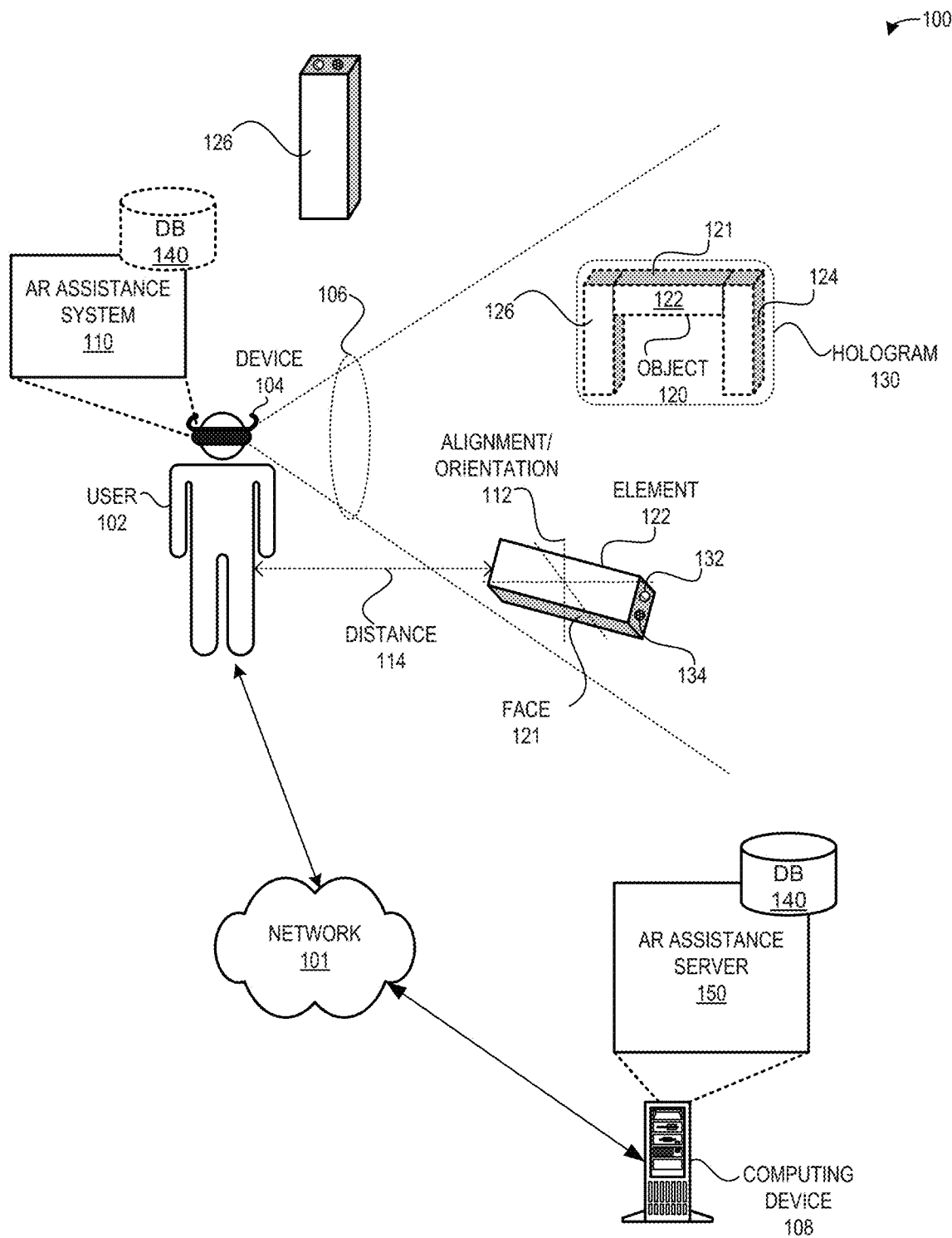
FIG. 1A illustrates an exemplary environment facilitating alignment- and orientation-based task assistance, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of real-world ambiguity in task management in an AR environment by providing an AR assistance system that projects affordances associated with an element of an object to a user. To do so, the system highlights the alignment and orientation of the element such that the user can complete a step of a task using the element without ambiguity. Such affordances can include, but are not limited to, highlighting critical regions or segments of the element to emphasize how that element can be incorporated with other elements of the object, projecting a partially assembled-object comprising other relevant elements, and highlighting the element and tools/fasteners needed for the step.

With existing technologies, an AR device can provide animated overlays that may help the user understand where an element can be placed. However, since the animation is predetermined, the animation does not consider the real-world orientation and alignment of the element, and the ambiguities that come with it. For example, the animation may not help the user understand which face of the element is the top face (i.e., should point upward) if the differences among the faces of the element are subtle. Furthermore, the AR device may not be able to help the user locate an element needed for the current step of the task. As a result, the user may not find the correct element (and corresponding tools/fasteners) or hold the element with a correct alignment and/or orientation to complete the step.

To solve these problems, the AR assistance system can assist the user in holding the element in a suitable orientation and align the element correctly with respect to the other elements of the object. This allows the user to place (or assemble) the element with other relevant elements of the object and efficiently complete the task. For example, if the object is a piece of equipment and the task is assembling the equipment, the system can assist the user in correctly aligning and orienting a respective element (e.g., a part of the equipment) such that the user can correctly assemble the equipment.

Suppose that a particular task involves operations (e.g., assembly, replacement, repair, etc.) on an object (e.g., a piece of equipment). During operation, the system can obtain a digital three-dimensional (3D) representation model, such as a computer-aided design (CAD) model, of the equipment. The system then determines the critical and/or distinguishable features of the model, and assigns markers to the regions corresponding to the determined features. When the user initiates the task using an AR device (e.g., an AR-enabled head-mounted display (such as a Microsoft HoloLens)), the system loads the model and the markers on the system.

To complete the task, the system may load a task model that indicates the steps and sequences of the task. The task model can include a set of steps and a set of operations. The transition between two steps can be indicated by an operation. For each step, starting from the initial step, the system determines the element of the object (and the tools/fasteners) needed for the step. The system can project a hologram (e.g., a translucent image) of the element (and the tools/fasteners) to assist the user in finding them. Once these items are in the "operating range" of the AR device (e.g., the visual region covered by a current focus of the AR device), the system can highlight the element (and the tools/fasteners). The system can use an object detector (e.g., a single-shot detector (SSD)) to detect the element and tools/fasteners once they are in the range of the AR device.

During a particular step of the task, if the user holds the element relevant to the step, the system detects the element using the object detector and retrieves the corresponding model of the element. The system then determines the pose of the element, which can include distance, orientation, and alignment of the element. For example, the object detector can indicate that the element is element "x" of product "y" (e.g., a leg of a chair), and the pose can indicate that the element is at 30 and 25 degrees from horizontal and vertical axes, respectively. The system then determines the markers and determines the regions on the element where the markers would appear based on the pose.

The system highlights the corresponding regions of the element with distinct marks (e.g., with distinct colors) such that the user can unambiguously understand how that element may be used for the step. For example, the highlighting can show how that element may fit with other elements of the object. The system can also project a hologram of the element depicting the element attached to other relevant elements of the object. In some embodiments, the system allows the user to choose between the highlighting or the hologram. Based on the choice, the system can facilitate the corresponding alignment- and orientation-based assistance to the user in the AR environment.

Subsequently, the system can determine whether the step has been completed by the user. For example, the system can determine whether the user has placed the element correctly based on the alignment and orientation of the element and other relevant elements. Once the step is completed, the system transitions to the next step based on the task model. However, if the system cannot detect the completion of the step, the system waits for an instruction (e.g., a "next step" command) from the user for transitioning to the next step. The system then repeats the process for the next step. In this way, the system assists the user to complete the task by showing alignment and orientation of a corresponding element to the user at each step.

Exemplary System

FIG. 1A illustrates an exemplary environment facilitating alignment- and orientation-based task assistance, in accordance with an embodiment of the present application. In this example, an AR environment 100 allows a user 102 to use an AR device 104 (e.g., a Microsoft HoloLens) for assistance with a task. Suppose that the task involves operations on an object 120. With existing technologies, device 120 can provide animated overlays that may help user 102 understand where an element 122 of object 120 can be placed. However, since the animation is predetermined, the animation does not consider the real-world orientation and alignment of element 122, and the ambiguities that come with it.

For example, the animation may not help user 102 understand that face 121 of element 122 is the top face (i.e., should point upward) if the differences among the faces of element 122 are subtle. Furthermore, device 104 may not be able to help user 122 locate an element 126 of object 120 if it is out of device 104's operating range 106 (e.g., the vision range of device 104). As a result, user 102 may not find an element 126 (and/or corresponding tools/fasteners) or hold element 122 with a incorrect alignment and/or orientation while executing a step of the task.

To solve these problems, AR device 104 can be equipped with an AR assistance system 110 that can project affordances associated with the task. System 110 can determine alignment and orientation 112 of element 122 to help user 102 complete a step of a task using element 122 without ambiguity. The affordances can include highlighting critical regions/segments of element 122 with distinct marks 132 and 134, such as distinct colors, to emphasize how element 122 can be incorporated with other elements 124 and 126 of object 120. Another affordance can be projecting a hologram 130 in range 106 showing element 122 attached to other relevant elements 124 and 124 (e.g., a partially assembled version of object 102 comprising elements 122, 124, and 126). Another affordance can be highlighting element 122 as well as tools/fasteners needed for the step.

In this way, system 110 can assist user 102 in holding element 122 in a suitable orientation and align element 122 correctly with respect to other elements 124 and 126. Based on marks 132 and 134, user 102 can determine that face 121 of element 122 is the top face (i.e., should point upward) while attached to elements 124 and 126. This allows user 102 to correctly place (or assemble) element 122 with elements 124 and 126, and efficiently complete the task. If object 120 is a piece of equipment and the task is assembling object 120, system 110 can assist user 102 in correctly aligning and orienting each part of object 120 such that user 102 can efficiently assemble object 120. When user 102 holds element 122, system 110 can use an object detector (e.g., a deep neural network, such as an SSD) to determine a pose, which includes distance 114, and alignment and orientation 112, for element 122.

To overlay marks 132 and 134 on element 122, system 110 can obtain a model of object 120 from a database 140 that stores the model. Database 140 can be a lightweight database hosted on device 104 (denoted with dotted lines) or on a database management system (DBMS) on an AR assistance server 150. Device 102 can communicate with a computing device 108, which hosts server 150, via a network 101 (e.g., a local or wide area network). Based on the model, system 110 can determine where to overlay marks 132 and 134, and based on the determination and the pose of element 122, determine the location of marks 132 and 134 on element 122. System 110 thus overlays marks 132 and 134 on element 122 oriented the way user 102 has been holding (i.e., the physical world orientation of element 122).

Figure 1B:
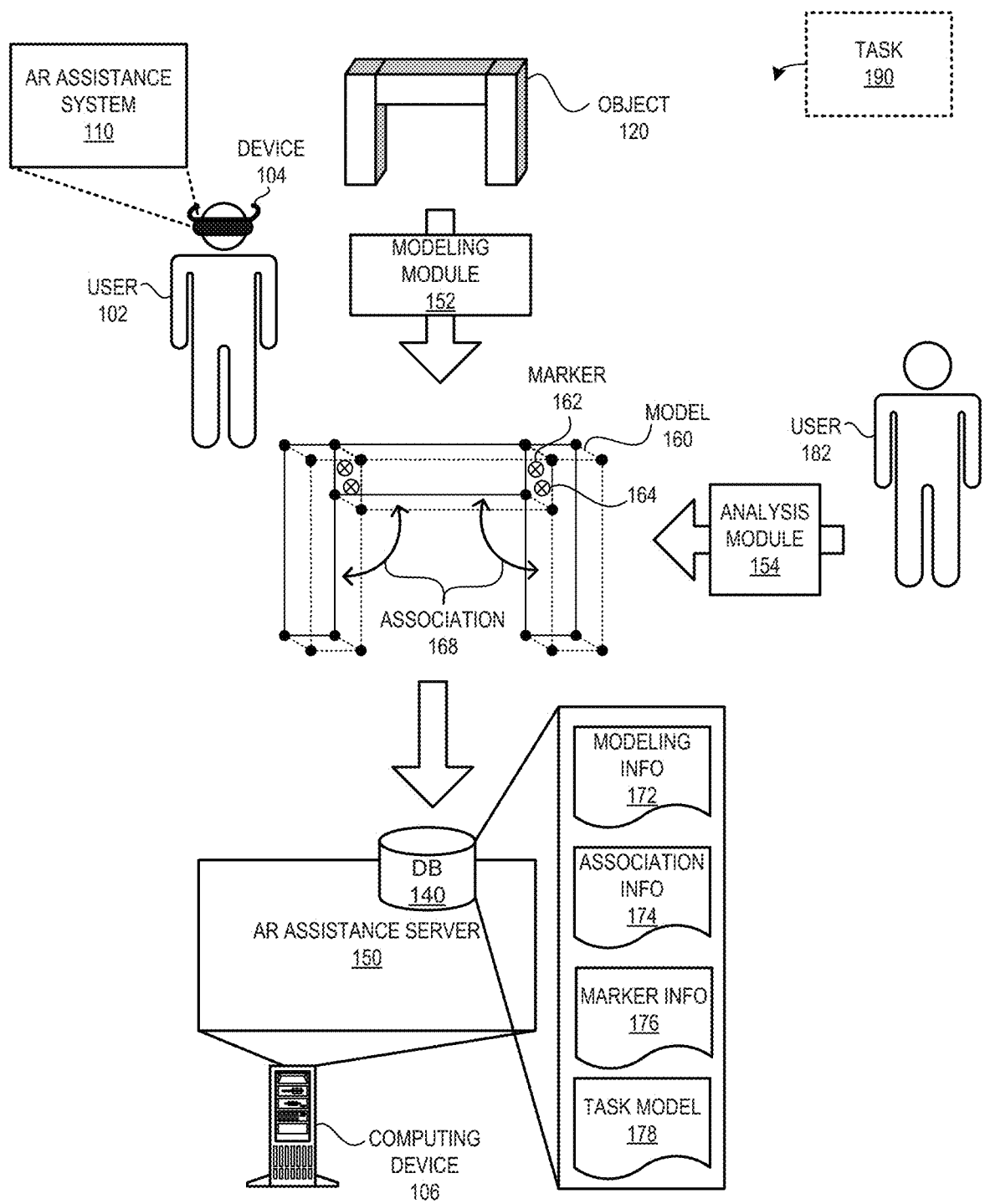
FIG. 1B illustrates an exemplary environment obtaining object information for facilitating alignment- and orientation-based task assistance, in accordance with an embodiment of the present application.

FIG. 1B illustrates an exemplary environment obtaining object information for facilitating alignment- and orientation-based task assistance, in accordance with an embodiment of the present application. To facilitate the operations of system 110, system 110 can obtain a digital 3D representation model 160, such as a CAD model, of object 120. To do so, system 110 can use a modeling module 152 (e.g., VuForia Object Scanner) on object 120 to generate modeling information 172 and generate a corresponding 3D model 160. In addition, system 110 can allow a user 182 to determine critical and/or distinguishable features from model 160 using an analysis module 154. Using analysis module 154 on model 160, user 182 can incorporate markers that indicate the regions/segments of each element of object 120 that should be highlighted.

For example, user 182 can place markers 162 and 164 on model 160. Markers 162 and 164 indicate the regions of element 122 that should be highlighted by system 110 when user 102 holds element 122, as described in conjunction with FIG. 1A. User 182 can repeat this process for each element of object 120 and generate corresponding marker information 176. System 110 can also determine the relevant elements associated with each element of object 120 and generate association information 174 for object 120. For element 122, system 110 can determine association 168, which indicates that element 122 is associated with elements 124 and 126. Association 168 can also be provided by user 182. If object 120 is associated with a task 190 (e.g., the assembly of object 120, or replacement of an element in object 120), system 110 can obtain the corresponding task model 178 as well.

Task motel 178 can indicate the steps needed to complete task 190, and elements (and tools and/or fasteners) needed for each step. Database 140 then stores modeling information 172, association information 174, marker information 176, and task model 178. If user 102 initiates task 190, system 110 can obtain the information associated with object 120 from database 140 and load the corresponding information on system 110 (e.g., in the memory of device 104). Based on the obtained information, system 110 can help user 102 execute task 190 by providing alignment- and orientation-based assistance to user 102.

Figure 2:
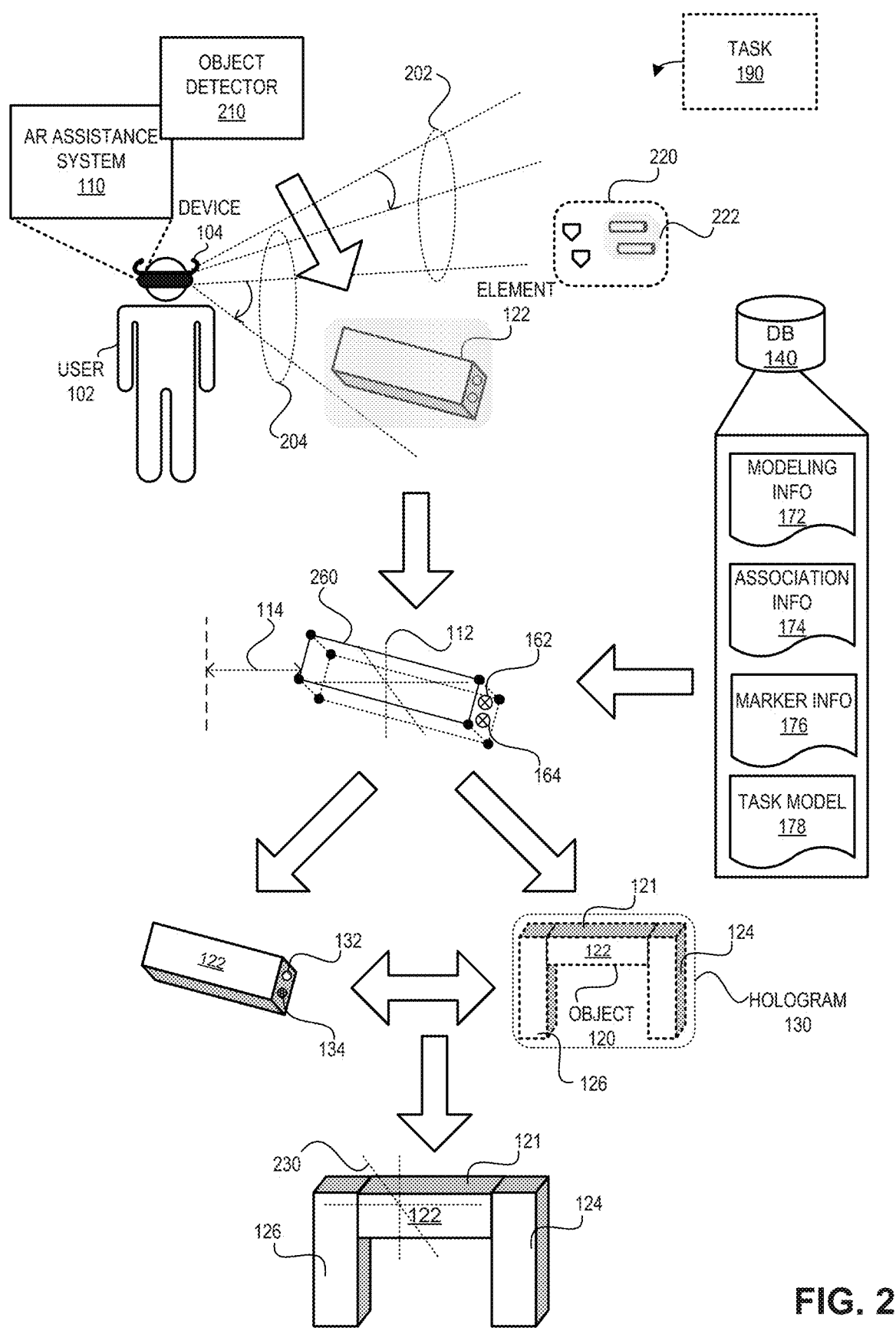
FIG. 2 illustrates an exemplary process for facilitating alignment- and orientation-based task assistance, in accordance with an embodiment of the present application.

FIG. 2 illustrates an exemplary process for facilitating alignment- and orientation-based task assistance, in accordance with an embodiment of the present application. To complete task 190, system 110 may load modeling information 172, association information 174, marker information 176, and task model 178 from database 140. Task model 178 can include a set of steps and a set of operations for each step. The transition between two steps can be indicated by an operation. For each step of task 190, starting from the initial step, system 110 determines an element of object 120 (and the tools/fasteners) needed for the step. System 110 can project a hologram of the element (and the tools/fasteners) needed for that step to assist user 102 in finding them. Suppose that a current step of task 190 is associated with element 122 and tools/fasteners 222. If a current operating range 202 of device 104 does not cover element 122 and/or tools/fasteners 222, system 110 can instruct user 102 (e.g., an instruction projected next to the hologram) to find them. By moving the direction of device 104 (e.g., looking at a different direction via device 104), user 102 can seek element 122 and tools/fasteners 222.

At an operating range 204 of device 104, system 110 may detect element 122 and a set of tools/fasteners 220 associated with object 120. System 110 then highlights element 122 and tools/fasteners 222 to indicate that these items would be needed for the step. System 110 can use an object detector 210 (e.g., an SSD) to detect element 122 and tools/fasteners 222 once they are in operating range 204 of device 104. When user 102 holds element 122, system 110 detects element 122 using object detector 210 and retrieves the corresponding 3D model 260 of element 122 from modeling information 172. System 110 then determines the pose of element 122. In some embodiments, system 110 can use deep-learning based regression classifiers on element 122 to determine its pose. The pose can include distance 114 from user 102, and orientation and alignment 112. For example, object detector 210 can indicate that element 122 is the top of a table, and the pose can indicate that element 122 is at 30 and 25 degrees from horizontal and vertical axes, respectively.

System 110 then determines the markers for element 122 from marker information 176. The markers can include marker 162 and 164, which can indicate the critical regions/segments on element 122. Based on the pose, system 110 determines where marker 162 and 164 should appear while user 102 is holding element 122. System 110 can highlight corresponding regions 132 and 134 of element 122 with distinct marks (e.g., with distinct colors) such that user 102 can unambiguously understand how element 122 may be used for the step. For example, the highlighting can show how element 122 may fit with other elements of object 120. System 110 can also obtain association information 174 to determine that elements 124 and 126 of object 120 are attachable to element 122. System 110 can then project hologram 130 showing element 122 attached to elements 124 and 126. In some embodiments, system 110 allows user 102 to choose and switch between the highlighting or the hologram based on an instruction (e.g., a verbal command or a gesture). Based on the choice, system 110 can facilitate the corresponding alignment- and orientation-based assistance to user 102.

Subsequently, system 110 can determine whether the step has been completed by user 102. For example, system 110 can determine whether user 102 has placed element 122 correctly (e.g., face 121 has been placed as the top face) with respect to elements 124 and/or 126 based on alignment and orientation 230 of element 122. Once the step is completed, system 110 transitions to the next step based on task model 178. However, if system 110 cannot detect the completion of the step, system 110 can wait for an instruction (e.g., a "next step" command) from user 102 for transitioning to the next step. System 110 then repeats the process for the next step. In this way, system 110 assists user 102 to complete task 190 by showing alignment and orientation of a corresponding element to user 102 at each step.

Exemplary Task Assistance

Figure 3A:
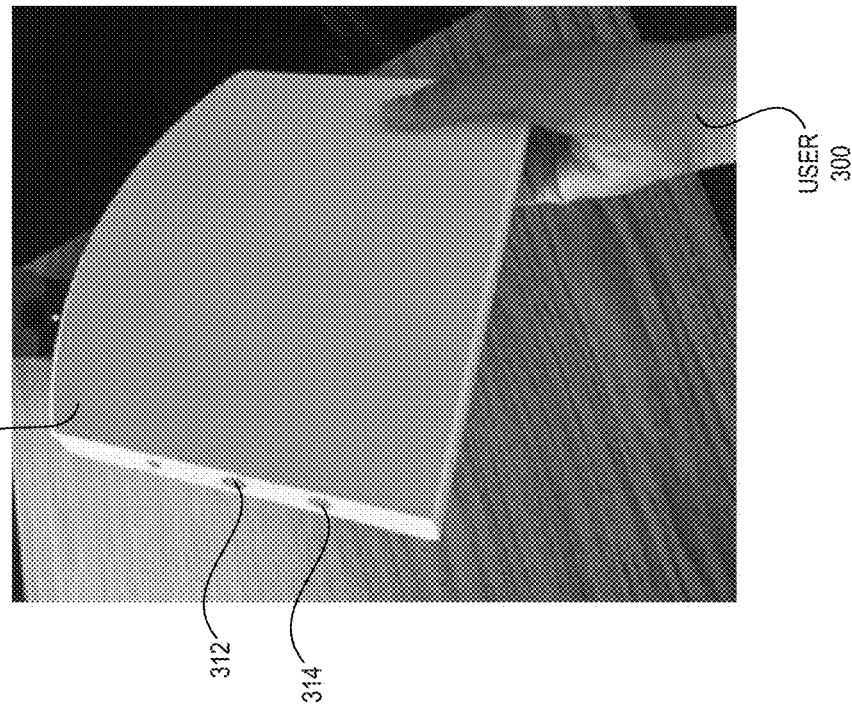
FIG. 3A illustrates an exemplary alignment for task assistance in an AR environment, in accordance with an embodiment of the present application.
Figure 3A:
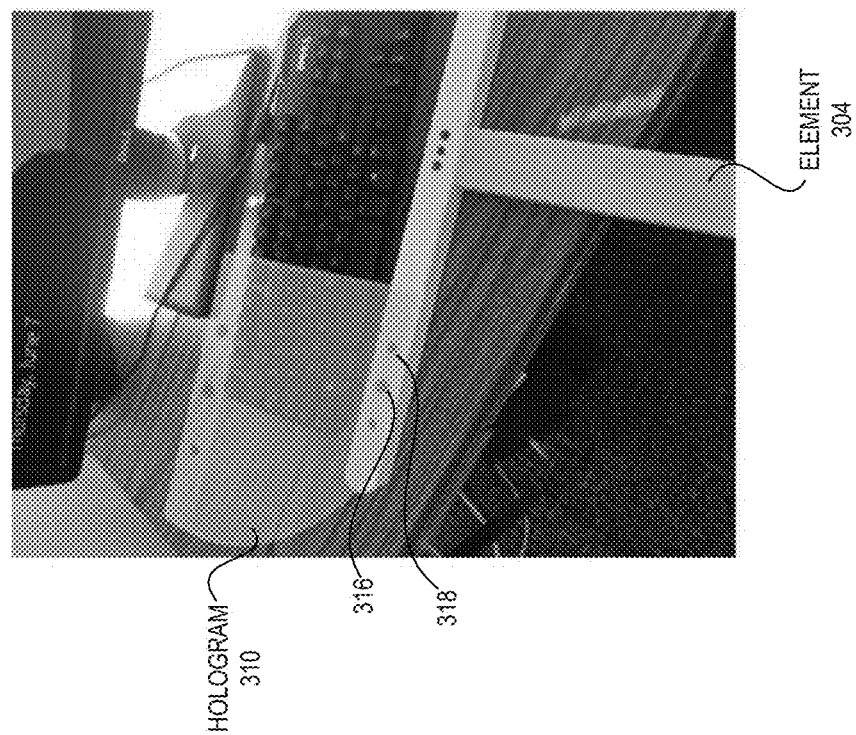

FIG. 3A illustrates an exemplary alignment for task assistance in an AR environment, in accordance with an embodiment of the present application. In this example, to attach two elements 302 and 304 of an object, user 300 may need to align dowels from element 304 in holes in element 302. Elements 302 and/or 304 may also include additional holes for screws. For example, dowel 316 should be inserted into hole 312 and dowel 318 should be inserted into hole 314. System 110 can overlay dowel 316 and hole 312 with the same colored highlight (e.g., the blue highlight in FIG. 3A). Similarly, system 110 can overlay dowel 318 and hole 314 with another same colored highlight (e.g., the orange highlight in FIG. 3A). In addition, system 110 can project a hologram 310 of element 302 on element 304 to show user 300 how elements 302 and 304 may fit together. This allows user 300 to easily distinguish which segments/regions of elements 302 and 304 should fit together in the correct orientation and alignment.

Figure 3B:
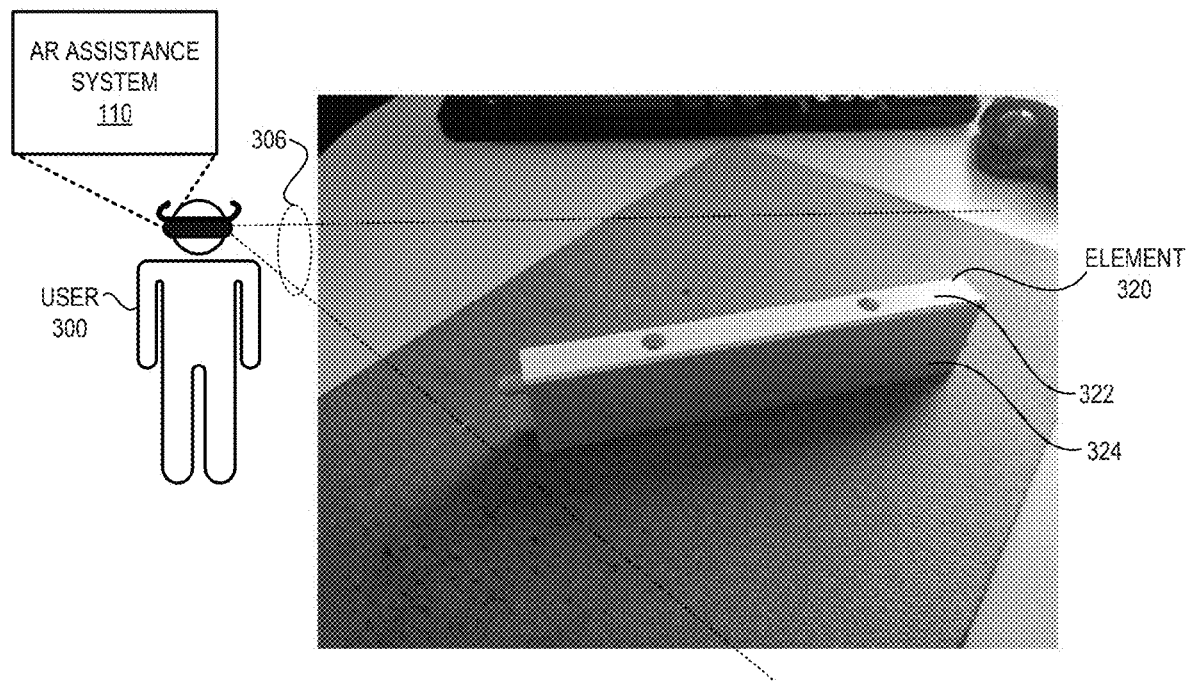
FIG. 3B illustrates an exemplary distinguishability enhancement for task assistance in an AR environment, in accordance with an embodiment of the present application.

FIG. 3B illustrates an exemplary distinguishability enhancement for task assistance in an AR environment, in accordance with an embodiment of the present application. An AR environment can often suffer from low contrast due to a condition of the physical world (e.g., low light or the shade of an object). As a result, relevant distinctions on an element 320 can become difficult for user 300 to detect due to the low contrast AR environment. Hence, user 300 may hard to find the relevant features in element 320. In this example, element 320 can have a white painted face 322 and an unpainted pine wood face 324 underneath. However, white painted face 322 can be difficult to distinguish from unpainted pine wood face 324, and yet, it can be critical for user 300 to distinguish these faces for orienting element 320 correctly. System 110 can apply contrast enhancement in its operating range 306 to make this distinction more salient.

Figure 3C:
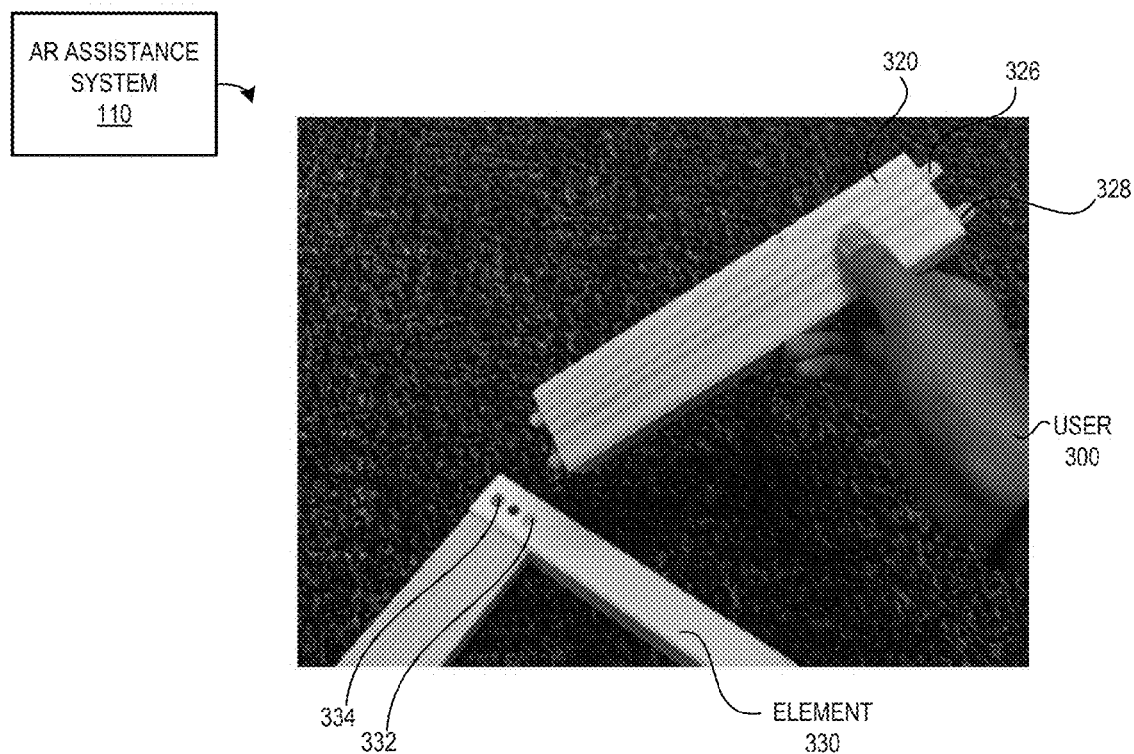
FIG. 3C illustrates an exemplary detection of ambiguity for task assistance in an AR environment, in accordance with an embodiment of the present application.

FIG. 3C illustrates an exemplary detection of ambiguity for task assistance in an AR environment, in accordance with an embodiment of the present application. System 110 can employ a deep-learning based regression classifier on elements 320 and 330 to determine their orientation. In this example, system 110 can determine the orientation of element 320 and overlay distinct marks on regions of element 320 that assists user 300 to attach element 320 to element 330 without ambiguity. To attach elements 320 and 330, user 300 may need to align the dowels of element 320 with the holes in element 330.

System 110 can overlay dowel 326 and hole 332 with a same colored highlight (e.g., the orange highlight in FIG. 3C). Similarly, system 110 can overlay dowel 328 and hole 334 with another same colored highlight (e.g., the blue highlight in FIG. 3C). Based on the highlights, user 300 can determine that element 320 should be flipped both horizontally and vertically to fit into element 330. In this way, even though the dowels on both sides of element 320 are identical, by using the orange and blue highlights, system 110 can assist user 300 to align elements 320 and 330 in the correct orientation with the paint side up (e.g., face 322 in FIG. 3B).

It should be noted that, for elements with unique textures/colors on different faces/sides, the regression classifier of system 110 may determine how the element should be oriented. However, if an element does not have clear and distinct textures/colors, the determination can become more difficult for the regression classifier. In some embodiments, system 110 can utilize this "difficulty" to determine whether to apply disambiguating overlay techniques. In particular, system 110 can operate under the principle that if the classifier can distinguish various orientations, user 300 can also do the same. However, if the classifier cannot recognize the orientation of an element, system 110 should apply disambiguating overlay techniques to the element to assist user 300.

Figure 3D:
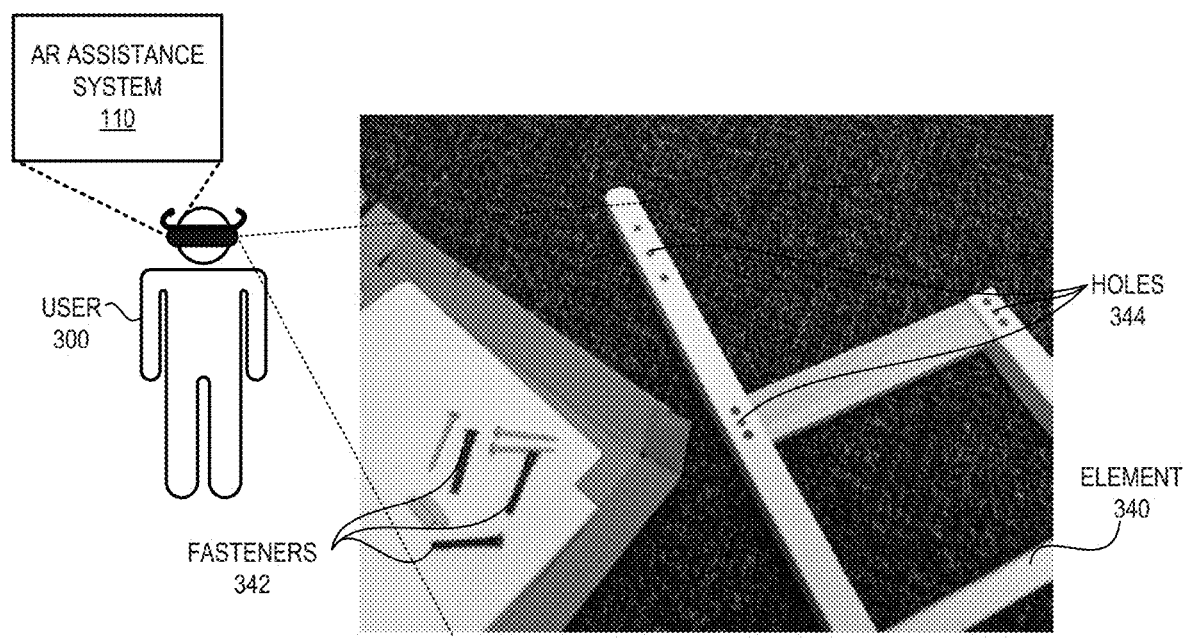
FIG. 3D illustrates an exemplary detection of tools/fasteners for task assistance in an AR environment, in accordance with an embodiment of the present application.

FIG. 3D illustrates an exemplary detection of tools/fasteners for task assistance in an AR environment, in accordance with an embodiment of the present application. When user 300 executes a task, user 300 may lay the elements and/or fasteners on a surface, such as a work table. If a particular step of the task needs tools/fasteners, system 110 can dynamically highlight the relevant tools/fasteners using an object detector, as described in conjunction with FIG. 2. To do so, system 110 can overlay the same color on the tools/fasteners and the corresponding regions/segments on an element (i.e., the holes that the fasteners go into). In this example, system 110 highlights fasteners 342 and the corresponding holes 344 on element 340 with the same color. Here, fasteners 342 needed for three holes 344 are highlighted in blue. In this way, system 110 can assist user 300 to locate and recognize the tools/fasteners needed for a particular step, and determine how the tools/fasteners should be used.

Figure 3E:
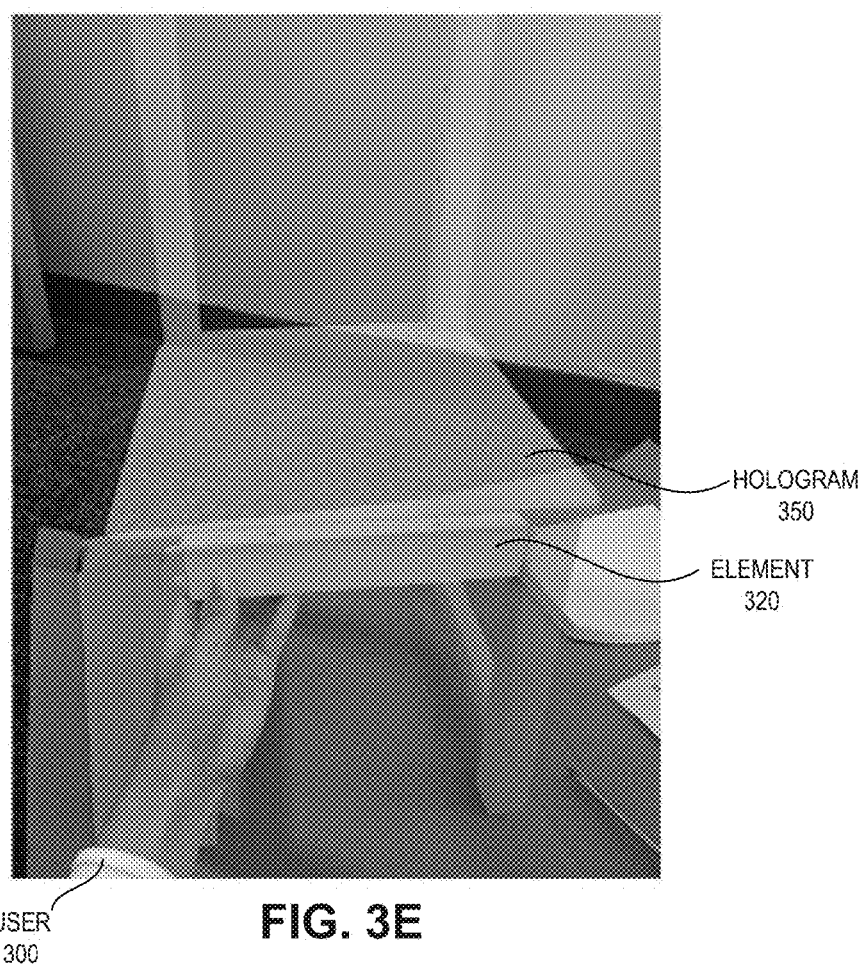
FIG. 3E illustrates an exemplary projection of look-ahead dependencies for task assistance in an AR environment, in accordance with an embodiment of the present application.

FIG. 3E illustrates an exemplary projection of look-ahead dependencies for task assistance in an AR environment, in accordance with an embodiment of the present application. In some cases, the orientation of an element, such as element 320, may not be apparent at a current step. However, the orientation of element 320 can become more obvious at a later step when additional elements are attached to element 320. To assist user 300 to clearly understand how element 320 should be assembled, system 110 can project a look-ahead hologram 350 (e.g., a translucent image) that depicts the elements that are immediately dependent on element 320 and how these elements are attached to element 320. In some embodiments, system 110 can project hologram 350 if user 300 holds element 320 at a certain orientation (e.g., horizontally in front of user 300). System 110 can also project hologram 350 based on an instruction (e.g., a verbal command or a gesture) from user 300.

It should be noted that, even though it is possible to project a hologram of the entire assembled object as a hologram, such depiction may be too complex and obscure for user 300 to comprehend at the current step. Hence, system 110 can determine the elements that are immediately dependent on element 322 (e.g., based on association information) and project hologram 350 comprising these elements to cue user 300 about the relevant dependencies of element 322 even though they may not be obvious at the current step. In this example, hologram 350 shows the elements that would fit element 320 so that user 300 knows the paint side of element 320 should be face down.

Operations

Figure 4:
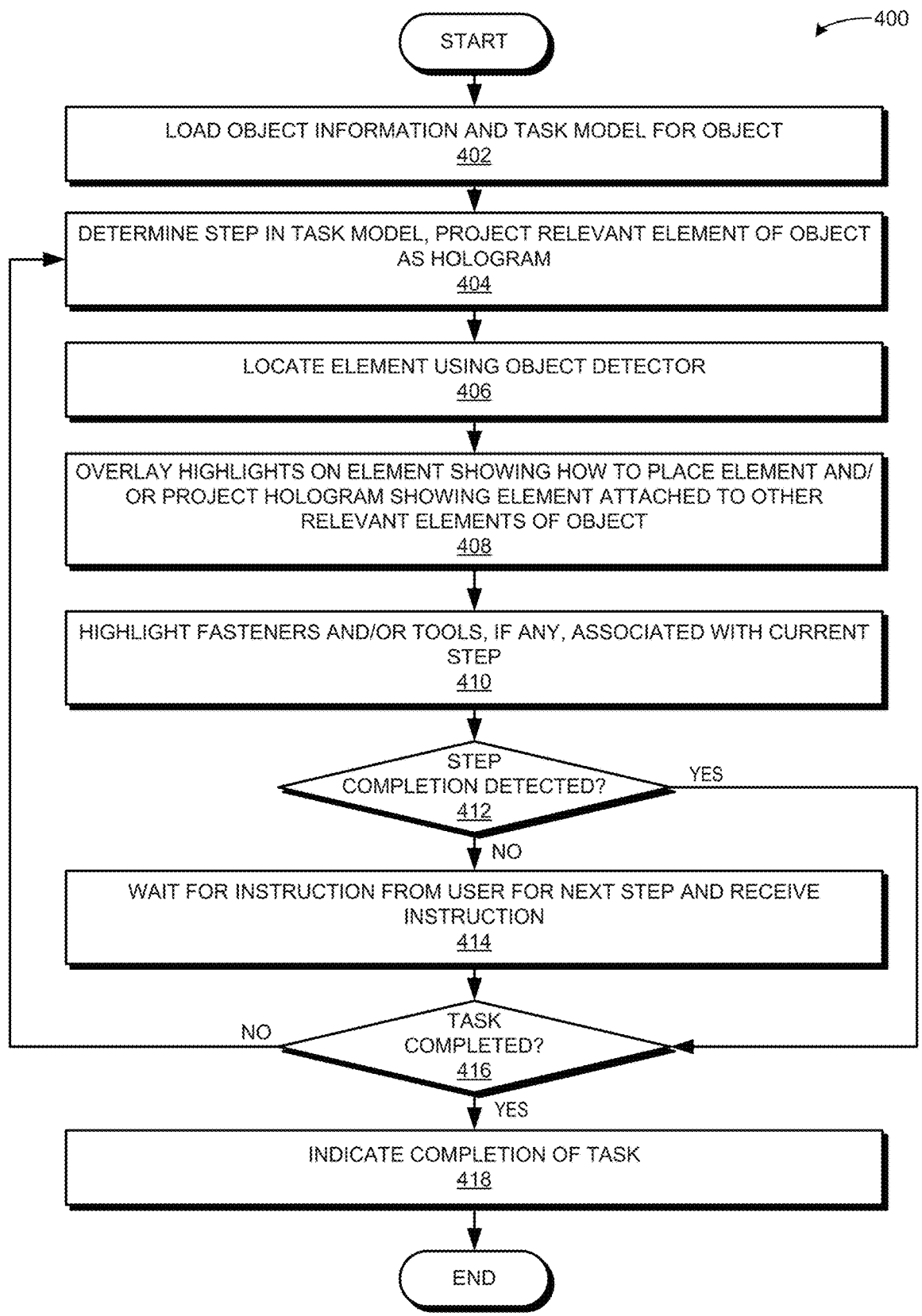
FIG. 4 presents a flowchart illustrating a method of an AR assistance system assisting the completion of a task, in accordance with an embodiment of the present application.

FIG. 4 presents a flowchart 400 illustrating a method of an AR assistance system assisting the completion of a task, in accordance with an embodiment of the present application. During operation, the system loads object information (e.g., modeling, association, and/or marker information) and a task model for an object (operation 402). The system then determines a current step in the task model and projects the relevant element of the object as a hologram (operation 404). This allows the user to find the relevant element(s) for the current step. The system then locates the element using an object detector (operation 406). Upon locating the element, the system overlays highlights (e.g., distinct markings) on the element showing how to place the element and/or project a hologram showing the element attached to other relevant elements of the object (operation 408).

The system can also highlight fasteners and/or tools, if any, associated with the current step (operation 410). The system then determines whether the system has detected the completion of the step (operation 412). If the step completion is not detected, the system waits for an instruction from the user (e.g., a verbal command) for the next step (operation 414). Upon receiving the instruction (operation 414) or if the step completion is detected (operation 412), the system determines whether the task is completed (operation 416). If the task is not completed, the system determines the next step in the task model and projects the relevant element of the object as a hologram (operation 404). If the task is completed, the system can indicate the completion of the task (operation 418).

Figure 5A:
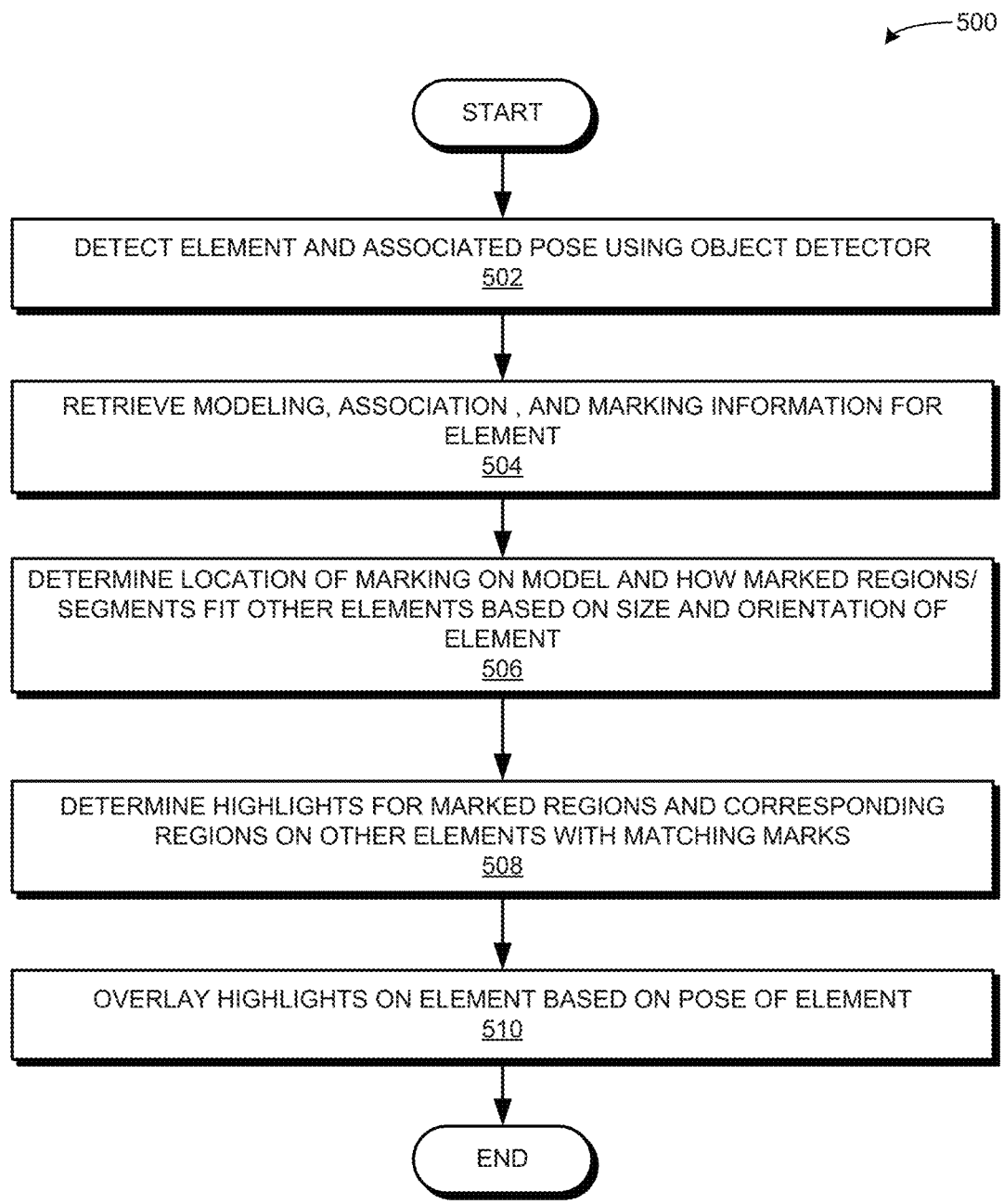
FIG. 5A presents a flowchart illustrating a method of an AR assistance system highlighting critical regions/segments of an object element for assisting the completion of a task, in accordance with an embodiment of the present application.

FIG. 5A presents a flowchart 500 illustrating a method of an AR assistance system highlighting critical regions/segments of an object element for assisting the completion of a task, in accordance with an embodiment of the present application. During operation, the system detects an element and an associated pose using an object detector (e.g., a deep-learning based regression classifier) (operation 502), and retrieves modeling, association, and marking information for the element (operation 504). It should be noted that, since the system loads modeling, association, and marking information for the object at the beginning of the task, the system can retrieve the information for each element from the loaded information.

The system then determines the location of markings on the model and how the marked regions/segments fit other elements based on the size and orientation of the element (operation 506). The system can determine the location of the markings based on the marking information and by matching the marking information with the corresponding modeling information. The system determines highlights for marked regions and corresponding regions on the other elements with matching marks (e.g., matching colors) (operation 508). The system then overlays the highlights on the element based on the pose of the element (operation 510).

Figure 5B:
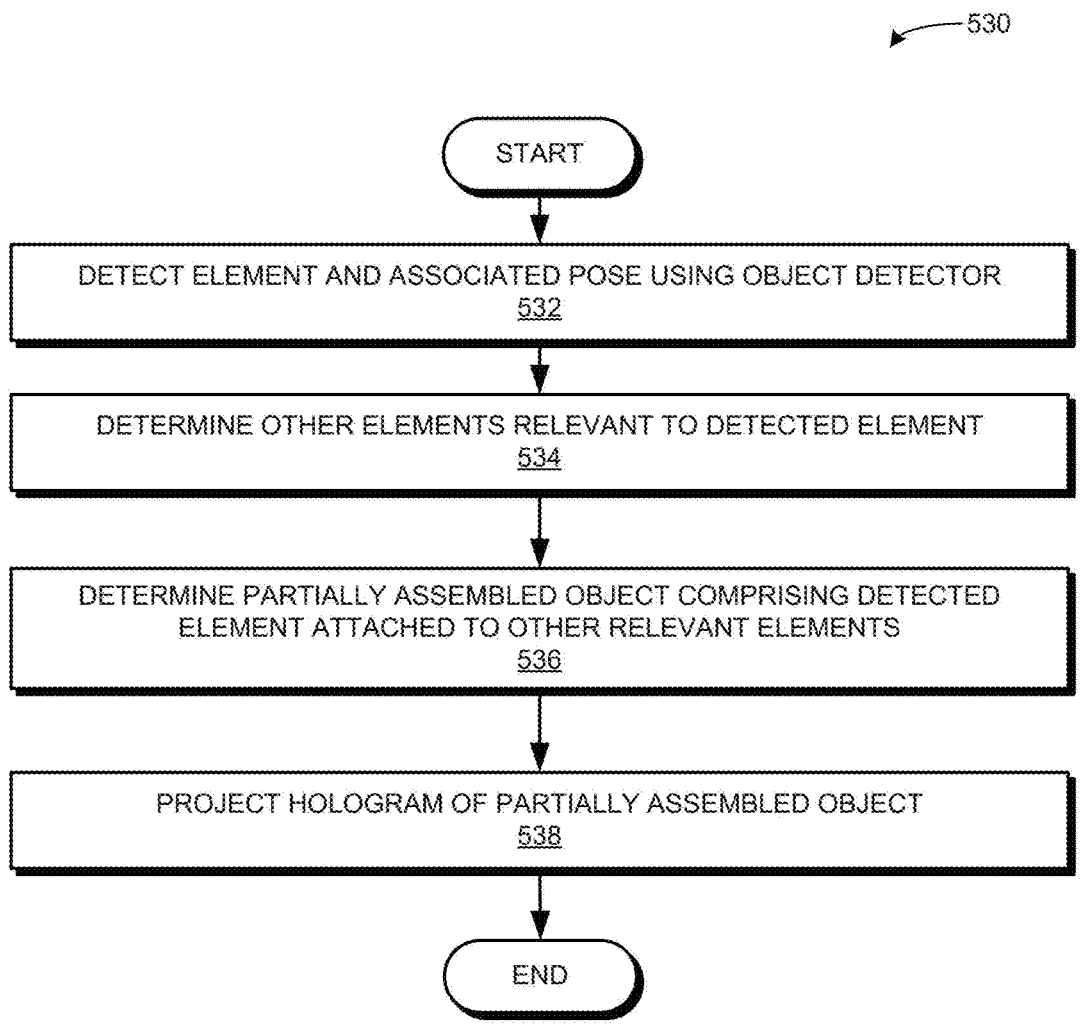
FIG. 5B presents a flowchart illustrating a method of an AR assistance system projecting a hologram of relevant elements of an object element for assisting the completion of a task, in accordance with an embodiment of the present application.

FIG. 5B presents a flowchart 530 illustrating a method of an AR assistance system projecting a hologram of relevant elements of an object element for assisting the completion of a task, in accordance with an embodiment of the present application. During operation, the system detects an element and the associated pose using an object detector (operation 532), and determines other elements relevant to the detected element (operation 534). The system determines a partially assembled object comprising the detected element attached to the other relevant elements (operation 536). The system then projects a hologram of the partially assembled object (operation 538).

Figure 5C:
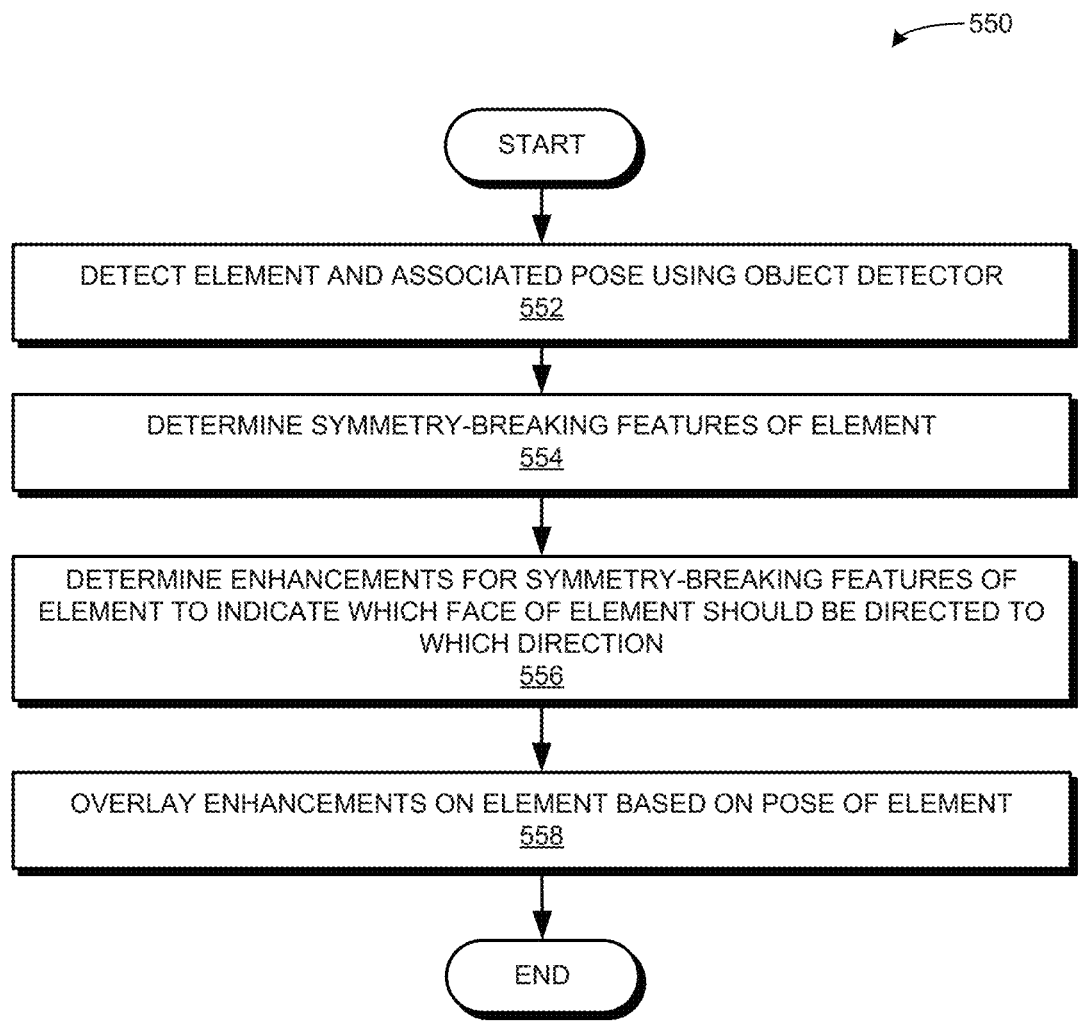
FIG. 5C presents a flowchart illustrating a method of an AR assistance system providing distinguishability enhancement of an object element for assisting the completion of a task, in accordance with an embodiment of the present application.

FIG. 5C presents a flowchart 550 illustrating a method of an AR assistance system providing distinguishability enhancement of an object element for assisting the completion of a task, in accordance with an embodiment of the present application. During operation, the system detects an element and the associated pose using an object detector (operation 552) and determines symmetry-breaking features of the element (operation 554). A symmetry-breaking feature indicates how the faces of the element are distinct (e.g., are asymmetric). In the example in FIG. 3B, a symmetry-breaking feature of element 320 can be the paint on face 322. The system determines enhancements for the symmetry-breaking features of the element to indicate which face of the element should be directed to which direction (operation 556). The system then overlays the enhancements on the element based on the pose of the element (operation 558).

Figure 6:
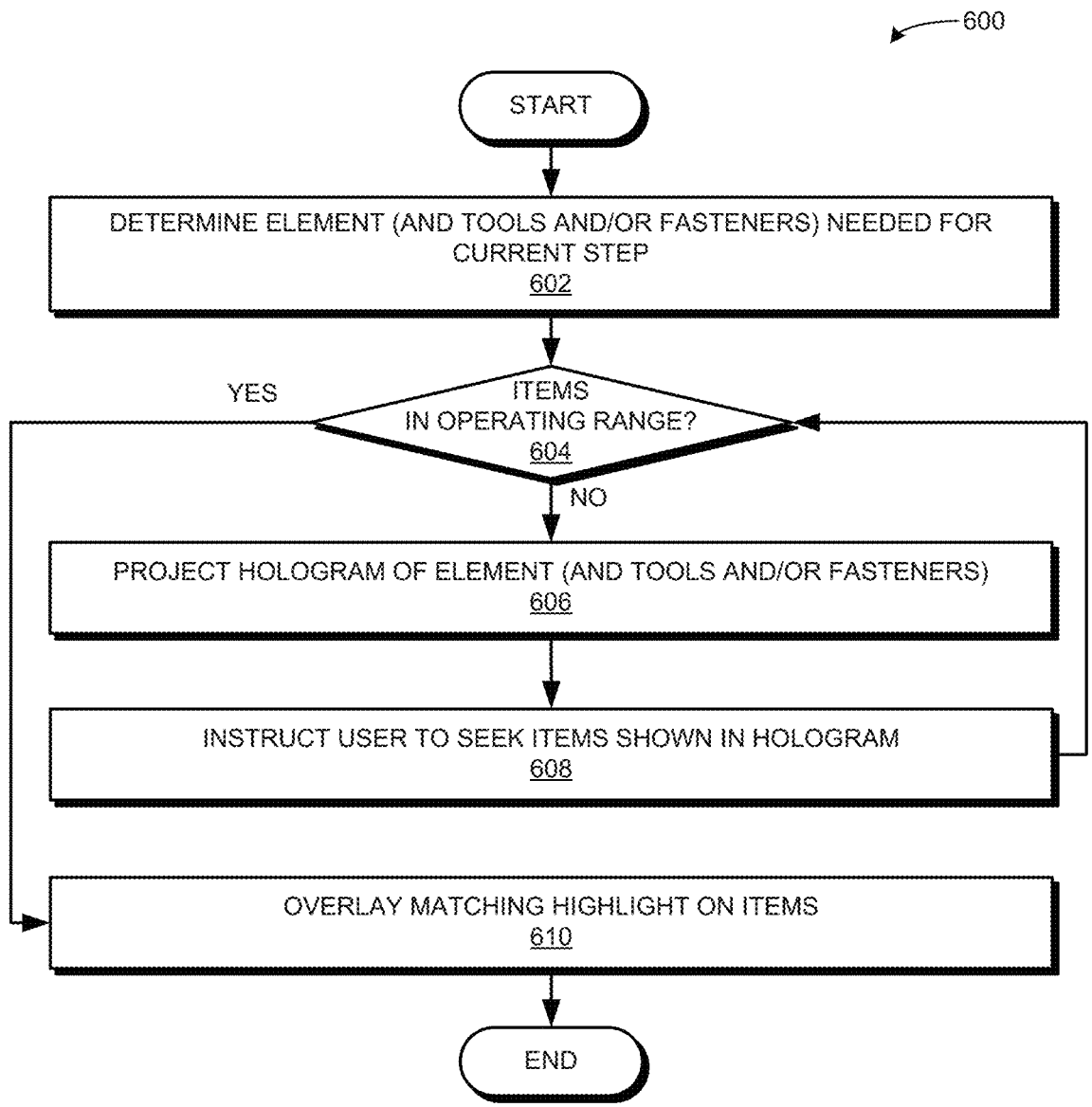
FIG. 6 presents a flowchart illustrating a method of an AR assistance system highlighting an object element and associated tools/fasteners needed for a current step of a task, in accordance with an embodiment of the present application.

FIG. 6 presents a flowchart 600 illustrating a method of an AR assistance system highlighting an object element and associated tools/fasteners needed for a current step of a task, in accordance with an embodiment of the present application. During operation, the system determines an element (and tools and/or fasteners) needed for a current step (operation 602). The system determines whether these items are in the operating range of the AR device (operation 604). If the items are not in the operating range, the system projects a hologram of the element (and tools and/or fasteners) (operation 606), and instructs the user to seek the items shown in the hologram (operation 608). The system then continues to determine whether these items are in the operating range of the AR device (operation 604). If the items are in the operating range, the system overlays a matching highlight on the items (operation 610).

Exemplary Computer System and Apparatus

Figure 7:
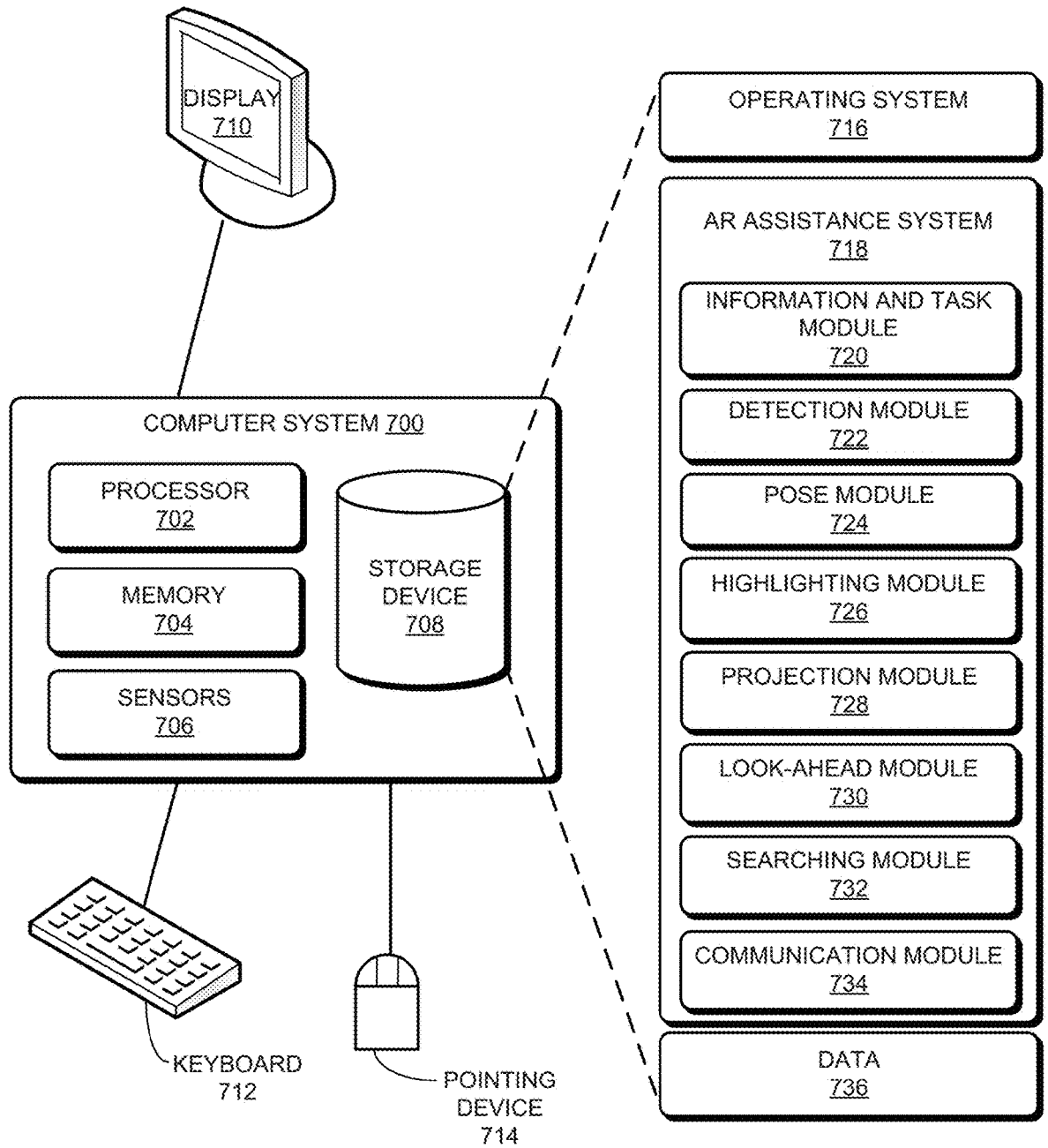
FIG. 7 illustrates an exemplary computer system that facilitates alignment- and orientation-based task assistance in an AR environment, in accordance with an embodiment of the present application.

FIG. 7 illustrates an exemplary computer system that facilitates alignment- and orientation-based task assistance in an AR environment, in accordance with an embodiment of the present application. Computer system 700 includes a processor 702, a memory device 704, a set of sensors 706, and a storage device 708. Sensors 706 can facilitate the operations of an AR device. Memory device 704 can include a volatile memory device (e.g., a dual in-line memory module (DIMM)). Furthermore, computer system 700 can be coupled to a display device 710, a keyboard 712, and a pointing device 714 (e.g., for a docketed AR device). Storage device 708 can store an operating system 716, an AR assistance system 718, and data 736. AR assistance system 718 can facilitate the operations of system 110.

AR assistance system 718 can include instructions, which when executed by computer system 700 can cause computer system 700 to perform methods and/or processes described in this disclosure. Specifically, AR assistance system 718 can include instructions for obtaining modeling, association, and marking information for an object, and a task model of a task associated with the object (information and task module 720). AR assistance system 718 can also include instructions for detecting an element and its symmetry-breaking features (detection module 722). Furthermore, AR assistance system 718 can also include instructions for determining a pose of the element (pose module 724).

Moreover, AR assistance system 718 can also include instructions for determining highlights for overlaying on the element such that a user can determine how the element should be oriented and placed (highlighting module 726). AR assistance system 718 can include instructions for projecting a hologram of the element (and tools and/or fasteners) needed for a respective step of the task (projection module 728). AR assistance system 718 can further include instructions for projecting a look-ahead hologram, which shows a set of elements that are immediately dependent on the element and how the set of elements are attached to the element (look-ahead module 730).

AR assistance system 718 can further include instructions for assisting the user to locate an element (and tools and/or fasteners) needed for a step of the task (searching module 732). AR assistance system 718 may further include instructions for sending and receiving messages (communication module 734). Data 736 can include any data that can facilitate the operations of AR assistance system 718. Data 736 can include, but are not limited to, any data stored in database 140, such as modeling information 172, association information 174, marker information 176, and task model 178.

Figure 8:
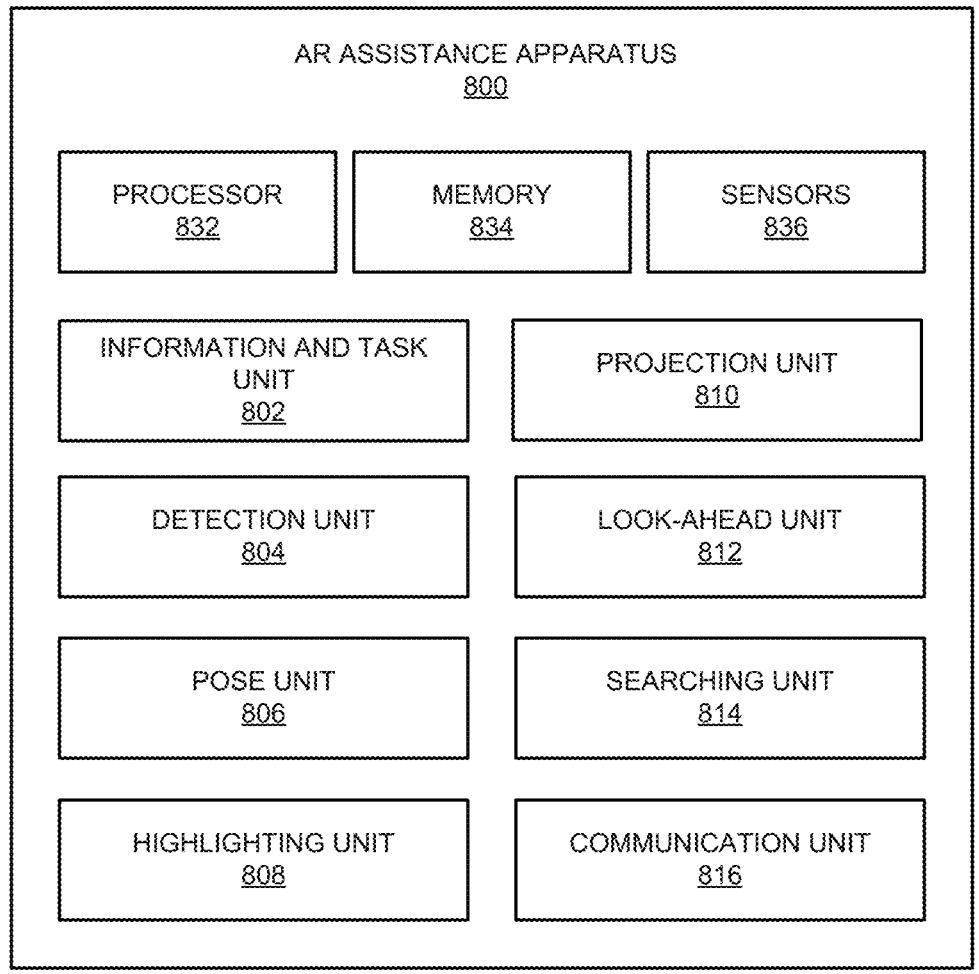
FIG. 8 illustrates an exemplary apparatus that facilitates alignment- and orientation-based task assistance in an AR environment, in accordance with an embodiment of the present application.

FIG. 8 illustrates an exemplary apparatus that facilitates alignment- and orientation-based task assistance in an AR environment, in accordance with an embodiment of the present application. AR assistance apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can include processor 832, memory 834, and sensors 836. Sensors 836 can facilitate the operations of an AR device. Furthermore, apparatus 800 can comprise units 802-816, which perform functions or operations similar to modules 720-734 of computer system 700 of FIG. 7, including: an information and task unit 802; a detection unit 804; a pose unit 806; a highlighting unit 808; a projection unit 810; a look-ahead unit 812; a searching unit 814; and a communication unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating dynamic assistance to a user in an augmented reality (AR) environment of an AR device, comprising:
   detecting, by the AR device, a first element of an object and an associated element using an object detector, wherein the object is associated with a task and the first element is associated with a step of the task, and wherein the associated element is external to the object and facilitates attachment of the first element to the object;
   determining an orientation and an alignment of the first element in physical world of the user;
   enhancing, within the AR environment, a resolution of an image of the first element;
   determining a hologram of the first element and the associated element, wherein the hologram distinctly depicts the first element and the associated element, and wherein the hologram indicates how the first element fits in the object; and
   projecting the hologram of the first element and the associated element in the AR environment, wherein the determined orientation triggers the projection of the hologram in the AR environment.

2. The method of claim 1, further comprising:
   determining that the first element is needed for the step; and
   projecting the hologram of the first element prior to locating the first element in an operating range of the AR device.

3. The method of claim 1, further comprising determining an overlay for one or more regions of the first element, wherein the overlay includes a distinct mark for a respective region of the one or more regions of the first element and the associated element, wherein the distinct mark indicates how the region fits with one or more other elements of the object.

4. The method of claim 3, further comprising:
   identifying respective markers on the one or more regions; and
   selecting the one or more regions for the highlighting based on the markers.

5. The method of claim 1, wherein the associated element includes a tool or a fastener;
   wherein detecting the associated element further comprises:
      determining that the associated element is needed for the step; and
      determining that the associated element is within an operating range of the AR device.

6. The method of claim 1, further comprising:
   determining one or more elements of the object that are attachable to the first element; and
   wherein projecting the hologram further comprising depicting, in the hologram, the first element being attached to the one or more elements in the AR environment.

7. The method of claim 1, further comprising:
   determining an overlay for one or more regions of the first element;
   determining a first region of the one or more regions of the first element, wherein the first region is attachable to a second region of a second element of the object; and
   setting a same mark in the overlay for the first and second regions; and
   placing the overlay on the one or more regions by placing the same mark on the first and second regions.

8. The method of claim 1, further comprising:
   determining whether the AR device is capable of determining that the step is complete;
   in response to the AR device determining that the step is complete, detecting a third element of the object using the object detector, wherein the third element is associated with a subsequent step of the step; and
   in response to the AR device being unable to determine that the step is complete, waiting for an instruction from the user.

9. The method of claim 1, further comprising:
   obtaining a three-dimensional model of the first element;
   identifying the one or more regions in the three-dimensional model; and
   projecting the hologram based on the identified one or more regions in the three-dimensional model.

10. The method of claim 1, further comprising determining the step of the task from a task model that includes one or more steps for completing the task, and wherein one or more elements of the object are associated with a respective step of the one or more steps.

11. An apparatus providing dynamic assistance to a user in an augmented reality (AR) environment, comprising:
   a processor;
   a storage device coupled to the processor and storing instructions that when executed by the processor cause the processor to perform a method, the method comprising:
      detecting, by the AR device, a first element of an object and an associated element using an object detector, wherein the object is associated with a task and the first element is associated with a step of the task, and wherein the associated element is external to the object and facilitates attachment of the first element to the object;
      determining an orientation and an alignment of the first element in physical world of the user;
      enhancing, within the AR environment, a resolution of an image of the first element;
      determining a hologram of the first element and the associated element, wherein the hologram distinctly depicts the first element and the associated element, and wherein the hologram indicates how the first element fits in the object; and
      projecting the hologram of the first element and the associated element in the AR environment, wherein the determined orientation triggers the projection of the hologram in the AR environment.

12. The apparatus of claim 11, wherein the method further comprises:
   determining that the first element is needed for the step; and
   projecting the hologram of the first element prior to locating the first element in an operating range of the apparatus.

13. The apparatus of claim 11, wherein the method further comprises determining an overlay for one or more regions of the first element, wherein the overlay includes a distinct mark for a respective region of the one or more regions of the first element, wherein the distinct mark indicates how the region fits with one or more other elements of the object.

14. The apparatus of claim 13, wherein the method further comprises:
   identifying respective markers on the one or more regions; and
   selecting the one or more regions for the highlighting based on the markers.

15. The apparatus of claim 11, wherein the associated element includes a tool or a fastener;
   wherein detecting the associated element further comprises:
      determining that the associated element is needed for the step; and
      determining that the associated element is within an operating range of the apparatus.

16. The apparatus of claim 11, wherein the method further comprises:
   determining one or more elements of the object that are attachable to the first element; and
   wherein projecting the hologram further comprises depicting, in the hologram, the first element being attached to the one or more elements in the AR environment.

17. The apparatus of claim 11, wherein the method further comprises:
   determining an overlay for one or more regions of the first element;
   determining a first region of the one or more regions of the first element, wherein the first region is attachable to a second region of a second element of the object; and
   setting a same mark in the overlay for the first and second regions; and
   placing the overlay on the one or more regions by placing the same mark on the first and second regions.

18. The apparatus of claim 11, wherein the method further comprises:
   determining whether the apparatus is capable of determining that the step is complete;
   in response to the apparatus determining that the step is complete, detecting a third element of the object using the object detector, wherein the third element is associated with a subsequent step of the step; and
   in response to the apparatus being unable to determine that the step is complete, waiting for an instruction from the user.

19. The apparatus of claim 11, wherein the method further comprises:
   obtaining a three-dimensional model of the first element;
   identifying the one or more regions in the three-dimensional model; and
   projecting the hologram based on the identified one or more regions in the three-dimensional model.

20. The apparatus of claim 11, wherein the method further comprises determining the step of the task from a task model that includes one or more steps for completing the task, and wherein one or more elements of the object are associated with a respective step of the one or more steps.

* * * * *